United States Patent
Santinanavat et al.

(10) Patent No.: US 6,705,342 B2
(45) Date of Patent: Mar. 16, 2004

(54) MODULATING GAS VALVE WITH NATURAL/LP GAS CONVERSION CAPABILITY

(75) Inventors: Mike C. Santinanavat, Chesterfield, MO (US); William P. Butler, St. Louis, MO (US)

(73) Assignee: Emerson Electric Co.

( * ) Notice: Subject to any disclaimer, the term of this patent is extended or adjusted under 35 U.S.C. 154(b) by 0 days.

(21) Appl. No.: 10/249,906

(22) Filed: May 16, 2003

(65) Prior Publication Data

US 2003/0168102 A1 Sep. 11, 2003

(51) Int. Cl.[7] .............................................. G05D 16/20
(52) U.S. Cl. ..................... 137/489; 137/505.14; 251/26; 251/30.01; 251/129.2
(58) Field of Search ................................. 137/269, 489, 137/492.5, 505.14, 613; 251/26, 30.01, 129.2

(56) References Cited

U.S. PATENT DOCUMENTS

| | | | | |
|---|---|---|---|---|
| 3,451,421 A | * | 6/1969 | Vicenzi et al. | 137/495 |
| 3,800,823 A | * | 4/1974 | Visos et al. | 137/489.5 |
| 4,637,429 A | * | 1/1987 | Dietiker et al. | 137/505.14 |
| 4,718,448 A | * | 1/1988 | Love et al. | 137/271 |
| 5,215,115 A | | 6/1993 | Dietiker | |
| 5,413,141 A | | 5/1995 | Dietiker | |
| 5,435,343 A | * | 7/1995 | Buezis | 137/489 |
| 5,988,204 A | | 11/1999 | Reinhardt et al. | |
| 6,302,143 B1 | * | 10/2001 | Sarlak | 137/505.14 |
| 2003/0010952 A1 | * | 1/2003 | Morete | 251/207 |

* cited by examiner

Primary Examiner—Ramesh Krishnamurthy
(74) Attorney, Agent, or Firm—Kevin Pumm

(57) ABSTRACT

An electronically modulating gas valve comprising a modulating solenoid for simultaneously displacing two servo regulator diaphragms, one for controlling LP Gas outlet pressure and another for controlling Natural Gas outlet pressure. A switch is used to select operation with either Natural or LP Gas, wherein the switch activates a gas selection solenoid for controlling gas flow through the Natural Gas servo regulator and the LP Gas servo regulator. The servo regulators are factory adjusted for a maximum Natural Gas pressure setting and a maximum LP Gas pressure setting. Thus, the gas valve is convertible from Natural Gas to LP Gas without re-adjustment.

10 Claims, 1 Drawing Sheet

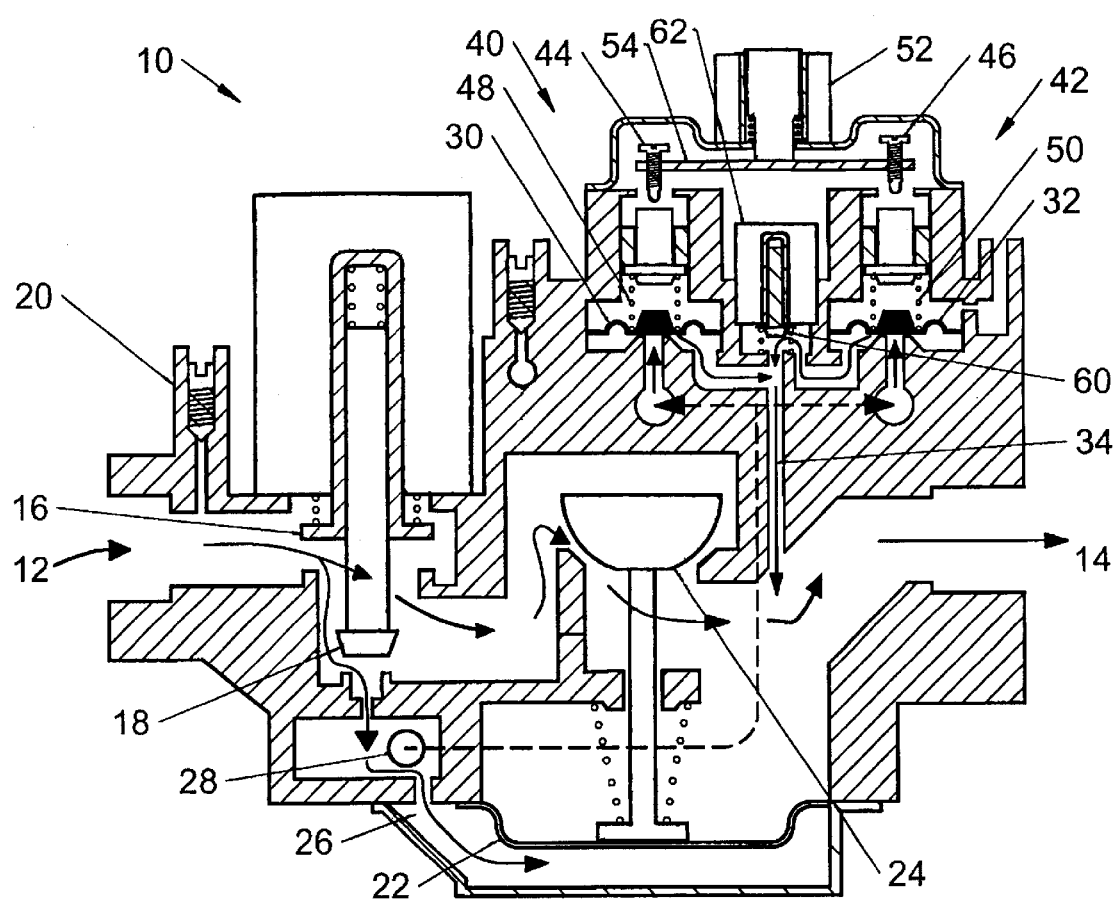

MODULATING GAS VALVE WITH NATURAL/LP GAS CONVERSION CAPABILITY

BACKGROUND OF INVENTION

Many attempts have been made to provide a gas valve that can be converted for use with either Natural Gas or Liquid Propane Gas. Several of these gas valve designs require replacement or readjustment of a biasing spring during conversion, as disclosed in Reinhardt et al, U.S. Pat. No. 5,988,204. Another such design is disclosed in Dietiker, U.S. Pat. No. 5,413,141. This gas valve design provides for first or second stage operation in response to a furnace control signal that switches the gas valve's pressure regulation from a first servo-regulator diaphragm to a second servo-regulator diaphragm. The gas valve further includes a selection means for converting both first and second servo-regulator diaphragm settings from a Natural Gas setting to a LP Gas setting. However, certain applications which demand more than two stages of gas valve operation require a modulating gas valve, as disclosed in Dietiker, U.S. Pat. No. 5,215,115. This gas valve is capable of modulating the outlet pressure in response to an electronic signal, but does not allow for conversion from Natural Gas pressure to LP Gas pressure. Natural Gas is typically supplied to a furnace at pressures up to 3.5 inches of water column, while LP Gas is supplied at pressures up to 10 inches of water column. Although modulating gas valves are available which can be converted from Natural Gas to LP Gas by readjustment of regulator settings, an increasing need exists for an electronically modulated gas valve that can be converted from Natural Gas to LP Gas operation without any readjustment.

SUMMARY OF INVENTION

The present invention provides for the use of either Natural Gas or LP Gas in an electronically modulating gas valve for a gas-fired heating apparatus, while simplifying the conversion from Natural Gas to LP Gas pressure settings. The pressure regulation means of the present invention comprises a modulating solenoid for simultaneously displacing two servo-regulator diaphragms, one for controlling a Natural Gas outlet pressure and the other for controlling a LP Gas outlet pressure. A switch is used to select operation with either Natural Gas or LP Gas, wherein the switch activates a gas selection solenoid for controlling gas flow through the Natural Gas servo-regulator and the LP Gas servo-regulator. Both servo-regulators are factory-adjusted for a maximum Natural Gas pressure setting and a maximum LP Gas pressure setting. Thus, the electronically modulating gas valve is capable of varying the supply of either Natural Gas or LP Gas up to their respective maximum outlet pressures, and is convertible from Natural Gas to LP Gas without requiring any adjustments.

BRIEF DESCRIPTION OF DRAWINGS

The sole FIGURE is a cross section view of the modulating gas valve incorporating the gas regulation and conversion means according to the principles of the present invention.

DETAILED DESCRIPTION

An electronically modulating gas valve incorporating the Natural Gas and LP Gas regulation and conversion means according to the principles of the resent invention is indicated generally as 10 The sole Figure. The electronically modulating gas valve control 10 comprises a housing having an inlet 12, an outlet 14, and a series of solenoid-operated valves 16 and 18, for controlling the flow of gas through the control. Normally closed valves 16 and 18 are opened by activation of a solenoid 20. The second valve 18 allows gas to flow into chamber 26 and apply pressure against a main diaphragm 22, which displaces a poppet-valve 24 to control the amount of gas flow or level of gas pressure at the valve outlet 14. A gas passage 28 provides gas flow from chamber 26 to two servo-regulator diaphragms 30 and 32. The servo-regulator diaphragms bleed off gas flow from chamber 26 to outlet passage 34, to regulate a control pressure applied to the main diaphragm 22. By varying the control pressure applied to the main diaphragm 22, the poppet-valve 24 can be controlled to vary the level of gas pressure at the valve outlet 14. A modulating solenoid displaces the servo-regulator diaphragm to vary the control pressure and outlet pressure accordingly. Because modulating valves of the subject type that modulate output flow via a current signal to a solenoid are well known in the art, the construction and operation of the modulating solenoid will not be described in detail.

While prior art devices that utilize displacement of a servo-regulator diaphragm via a modulating solenoid have been know, the present invention simultaneously displaces two servo-regulator diaphragms for the purpose of enabling operation with either Natural Gas or LP Gas. Specifically, the gas valve control 10 further comprises a modulating solenoid 52 controlled by a single signal for displacing a first adjustable servo-regulator 40 for controlling a LP Gas outlet pressure, and a second adjustable servo-regulator 42 for controlling a Natural Gas outlet pressure. Adjustments to the servo-regulator settings are made by adjusting screws 44 and 46, which displace two biasing springs 48 and 50 to adjust the biasing force against servo-regulator diaphragms 30 and 32. The first servo-regulator 40 is adjusted to provide a maximum outlet pressure of 10 inches of water column typical for LP Gas operation. The second servo-regulator 42 is adjusted to provide a maximum outlet pressure of 3.5 inches of water column typical of Natural Gas operation. The supply of either LP Gas and Natural Gas can be varied up to their respective maximum outlet pressures by the modulating solenoid 52 that controls displacement of carrier element 54 and screws 44 and 46, which displace springs 48 and 50 to vary the biasing force against servo-regulator diaphragms 30 and 32. Selecting operation for either Natural Gas or LP Gas is accomplished by a gas selection valve 60, which enables or disables gas flow to the servo regulators 40 and 42.

A selection switch (not shown) activates a gas selection solenoid 62 to close the normally open gas selection valve 60 and block gas flow through the Natural Gas servo-regulator diaphragm 32 to the passage 34. When only the LP Gas servo-regulator diaphragm 30 is bleeding off gas flow from chamber 26, a higher control pressure is applied to main diaphragm 22 to provide the higher outlet pressure typical for LP Gas to the valve outlet 14. When the solenoid 62 is not activated, the gas selection valve 60 opens, enabling gas flow through the Natural Gas servo-regulator diaphragm 32 and passage 34. When the gas selection valve 60 is open, gas flow from passage 26 is supplied to Natural Gas servo-regulator diaphragm 32 and LP Gas servo-regulator diaphragm 30. When both the Natural Gas servo-regulator diaphragm 32 and the LP Gas servo-regulator diaphragm 30 are bleeding off gas flow through passage 34, a lower control pressure is applied to main diaphragm 22 to provide the lower outlet pressure typical for Natural Gas to the valve outlet 14. Since screws 44 and 46 are factory adjusted to a maximum LP Gas outlet pressure and Natural Gas outlet pressure, the electronically modulating gas valve control 10 can be converted from LP Gas to Natural Gas via the gas selection solenoid without any adjustment of the servo-regulator settings.

In operation, a single electronic signal is supplied by a furnace control to the solenoid 52, for affecting changes in the gas valve's outlet pressure. The electronic signal to the gas valve may be varied by the furnace control according to changes in heating demand. The modulating solenoid 52 variably displaces the carrier 54 and screws 44 and 46, to displace the biasing springs 48 and 50. When the gas selection solenoid is energized by the selector switch, gas flows only through the LP Gas servo-regulator diaphragm 30. Thus the modulating solenoid displaces the biasing spring 48 against the LP Gas servo-regulator diaphragm 30 to affect the gas pressure at the gas valve outlet 14. The Natural Gas servo-regulator diaphragm 32 does not affect the gas outlet pressure since selection valve 60 does not allow gas flow through the Natural Gas servo-regulator diaphragm. At some point during the operating life of the furnace or other appliance, the type of fuel gas may be changed from LP Gas to Natural Gas. At such time, conversion of the gas valve 10 to Natural Gas operation simply entails moving the selector switch to affect de-activation of the gas selection solenoid 62. When the gas selection solenoid 62 is de-energized, gas flows through both the LP Gas servo-regulator diaphragm 30 and the Natural Gas servo-regulator diaphragm 32. The adjustment screw 46 is preset such that the amount of gas flow that the Natural Gas servo-regulator diaphragm 32 bleeds off, in addition to that which the LP Gas servo-regulator diaphragm bleeds off, will reduce the control pressure applied to regulating diaphragm 22 to provide the correct outlet pressure for Natural Gas. The same electronic signal is used for both Natural Gas or LP Gas operation; no switching or change in signal output from the furnace control is required. No re-adjustment to the electronically modulating gas valve is required for the conversion of gas type.

Those skilled in the art will recognize that the inventive gas convertible modulating valve of this invention may be useful in many applications and for control of many different types of fluids, and is especially useful for control of gaseous fuel flow. Inasmuch as many modifications within the spirit of the invention will be apparent to those skilled in the art, the scope of the invention should be determined by reference to the claims appended below and the full scope of equivalents as provided by applicable laws.

What is claimed is:

1. An electronically modulated gas valve control having a modulating solenoid for providing a variable displacement in response to an electronic signal, the gas valve control comprising:

a housing means having an inlet, an outlet and a valve seat between the inlet and outlet;

a poppet that is moveable relative to the valve seat to vary the gas pressure to the outlet;

a regulator diaphragm configured to form a chamber between the housing and one side of the regulator diaphragm, wherein the regulator diaphragm moves in response to pressure changes in the chamber and moves the poppet that varies the gas pressure to the outlet;

first and second servo-regulator assemblies arranged in parallel for producing a control pressure in the chamber for controlling the regulator diaphragm movement and gas pressure to the outlet, the first and second servo-regulator assemblies further being dependent on biasing provided respectively by first and second biasing springs;

an electrically operable valve for selectively blocking gas flow through the second servo-regulator assembly or selectively enabling gas flow through both first and second servo-regulator assemblies, to provide two different control pressures for establishing two different outlet pressures; and a carrier displaced by the modulating solenoid, having first and second screws for displacing the first and second biasing springs respectively.

2. The electronically modulating gas valve control of claim 1, wherein the first and second adjustment screws are operable to adjust the two different outlet pressures to the maximum predetermined outlet pressures for two different types of gas.

3. An electronically modulated gas valve control having a modulating solenoid for providing a variable displacement in response to an electronic signal, the gas valve control comprising:

a housing means having an inlet, an outlet and a valve seat between the inlet and outlet;

a poppet that is moveable relative to the valve seat to vary the gas pressure to the outlet;

a regulator diaphragm configured to form a chamber between the housing and one side of the regulator diaphragm, wherein the regulator diaphragm moves in response to pressure changes in the chamber and moves the poppet that varies the gas pressure to the outlet;

first and second servo-regulator assemblies arranged in parallel for producing a control pressure in the chamber for controlling the regulator diaphragm movement and gas pressure to the outlet, the first and second servo-regulator assemblies being connected to the chamber by a passageway;

an electrically operable valve for selectively blocking gas flow through the second servo-regulator assembly or selectively enabling gas flow through both first and second servo-regulator assemblies, to provide two different control pressures for establishing two different outlet pressures;

first and second biasing springs for biasing first and second servo-regulator assemblies respectively; and a carrier displaced by the modulating solenoid and having first and second screws for displacing the first and second biasing springs respectively, wherein the first and second screws are operable to adjust the two different outlet pressures to the maximum predetermined outlet pressures for two different types of gas.

4. An electronically modulated gas valve control having a modulating solenoid for providing a variable displacement in response to an electronic signal, the gas valve control comprising:

a housing means having an inlet, an outlet and a valve seat between the inlet and outlet; a poppet that is moveable relative to the valve seat to vary the gas pressure to the outlet;

a regulator diaphragm configured to form a chamber between the housing and one side of the regulator diaphragm, wherein the regulator diaphragm moves in response to pressure changes in the chamber and moves the poppet that varies the gas pressure to the outlet;

first and second servo-regulator assemblies arranged in parallel for producing a control pressure in the chamber for controlling the regulator diaphragm movement and gas pressure to the outlet, the first and second servo-regulator assemblies being connected to the chamber by a passageway;

a selection valve for selectively blocking gas flow through the second servo-regulator assembly or selectively enabling gas flow through both first and second servo-regulator assemblies, to provide two different control pressures for establishing two different outlet pressures;

a solenoid for operating the selection valve, wherein the selection valve is open when the solenoid is activated and the selection valve is closed when the solenoid is deactivate;

first and second biasing springs for biasing first and second servo-regulator assemblies respectively; and a carrier displaced by the modulating solenoid and having first and second screws for displacing the first and second biasing springs respectively, wherein the first and second screws are operable to adjust the two different outlet pressures to the maximum predetermined outlet pressures for two different types of gas.

5. An electronically modulating gas valve control according to claim 4, wherein the electronic signal to the modulating solenoid is a single signal for producing a variable displacement of the carrier that is utilized for operation with either of the two different types of gas.

6. An electronically modulating gas valve control according to claim 4, wherein the selection valve blocks gas flow through the second regulator by closing off a passage leading from the second diaphragm to the gas valve exit.

7. An electronically modulating gas valve control according to claim 4, wherein the selection valve is operated by a selection switch that provides for operation at either a first or second operation pressure range corresponding to a first or second type of gas respectively.

8. An electronically modulating gas valve control according to claim 4, wherein the first and second screws for adjusting the two outlet pressures are factory-adjusted to a predetermined maximum outlet pressure for a first and second type of gas, such that no further adjustment is necessary for conversion from the first gas type to the second gas type.

9. An electronically modulating gas valve control according to claim 4, wherein the carrier is variably displaced by the modulating solenoid in a manner such that the displacement provides an outlet pressure that ranges from a minimal outlet pressure to the predetermined maximum outlet pressures for the two different types of gas.

10. An electronically modulating gas valve control according to claim 9, wherein the two different types of gas comprise natural gas and liquid propane gas.

* * * * *